United States Patent Office 3,109,005
Patented Oct. 29, 1963

3,109,005
PROCESS FOR MAKING 2-PYRROLIDONE
FROM MALEIC ANHYDRIDE
Rex E. Lidov, Great Neck, N.Y., assignor to Halcon
International, Inc., a corporation of Delaware
No Drawing. Filed May 15, 1961, Ser. No. 109,824
3 Claims. (Cl. 260—326.5)

This invention relates to a process for the manufacture of alpha-pyrrolidones from maleic anhydride, and more particularly to a one-step reaction of the anhydride with ammonia and hydrogen, and recovering the alpha-pyrrolidone from the resulting reaction mixture.

Known methods for preparing alpha-pyrrolidone involve preparing butyrolactone and converting it to the lactam, or the preparation and isolation or semi-isolation of other intermediates on the way to the lactam. The art is confronted by the problem of providing more efficient and economical processes for producing this and other pyrrolidones.

The discoveries associated with the invention and relating to the solution of the above problems, and the objects achieved in accordance with the invention as set forth herein include the provision of:

A method of preparing an alpha-pyrrolidone which comprises catalytically reacting the corresponding maleic anhydride with ammonia or a primary amine and hydrogen under elevated temperatures and pressure, and recovering the desired pyrrolidone;

Such a method wherein the temperature is in the range of 150° to 350° C. and the pressure is in the range of 100 to 300 atms.;

Such a method wherein maleic anhydride is converted to alpha-pyrrolidone at about 250° C. and about 200 atms. in the presence of a solvent;

Such a method wherein the solvent is isopropyl ether;

Such a method wherein the solvent is xylene;

Such a method wherein citraconic anhydride is converted to methyl-pyrrolidone;

Such a method carried out at 250° C. and 200 atms. pressure in the presence of cyclohexane;

Such a method wherein citraconic anhydride is converted to n-methyl-pyrrolidone;

Such a method carried out at 250° C. and 200 atms. pressure in the presence of dioxane;

Such a method wherein citraconic anhydride is converted to N,3-dimethyl pyrrolidone;

Such a method carried out at 250° C. and 200 atms. pressure in the presence of toluene;

And other objects which will be apparent as details or embodiments of the invention are set forth hereinafter.

In order to indicate still more fully the nature of the present invention, the following examples of typical procedures are set forth in which parts and percent mean part and percent by weight respectively, unless otherwise indicated, it being understood that these examples are presented as illustrative only and are not intended to limit the scope of the invention.

Example 1

A benzene air mixture containing 1.21 mol percent of benzene is fed downward through a tubular reactor at a volume space velocity of 2,500/hr. (volume of feed gas per volume of catalyst per hour), at a reaction temperature of 365° C. (using a modified vanadia catalyst as described in the Robert E. Egbert and Mitchell Becker Patent, U.S. Patent No. 2,777,860, issued January 15, 1957).

The reactor tube may be of ⅞ inch internal diameter and the catalyst bed height may be 10 feet. The tube may be surrounded by a temperature regulating medium such as molten salt, molten metal or a copper jacket.

The gaseous reaction mixture is passed through a partial condenser containing one or more vertical tubes of about one inch internal diameter and about 8 feet in length. The tubes are surrounded by a temperature regulating medium maintained at 53° to 58° C., e.g., circulating water. About one third of the maleic anhydride content of the gas is condensed and drains out as a liquid. The remainder of the gas is passed to a water scrubbing column or tower wherein it is contacted countercurrently with water or aqueous maleic acid so as to provide a 40 percent by weight aqueous maleic acid solution.

This solution is dehydrated in a column in the presence of xylene as an azeotroping agent (the distilled water being removed and the xylene being recirculated as reflux to the column). A crude maleic anhydride material which may contain about 20 percent xylene is removed as bottoms.

A mixture of 98 parts of maleic anhydride, 5 parts of Raney nickel, and 150 parts of dioxane is charged into a pressure vessel, equipped with an efficient sealed stirrer. Then after addition of 85 parts of ammonia, the vessel is additionally pressured with hydrogen until the total pressure is 150 atms. The stirrer is started and the vessel is heated to 250° C. and additional hydrogen is added until the pressure is raised to 200 atms. As the reaction proceeds, additional hydrogen is added from time to time to maintain the pressure at 200 atms. After about ten hours the reaction is complete.

After cooling, the excess hydrogen and ammonia are discharged and the reaction solution is separated from the catalyst by filtration. Fractional distillation of the filtrate gives 63.0 parts of pyrrolidone boiling at 76° C. under a pressure of 0.2 mm. Hg abs. The yield is about 76% of theoretical.

Example 2

The above procedure is repeated except that the solvent is 200 parts of isopropyl ether and a twelve hour reaction time is employed. A similar yield and quality of product are obtained.

Example 3

The above procedure is repeated using 112 parts of citraconic anhydride, 150 parts of toluene, 5 parts of Raney nickel, and 68 parts of ammonia, for twelve hours at 250° C. with hydrogen at a total pressure of 200 atms. The methyl pyrrolidone fraction recovered is 65% of the amount theoretically obtainable.

Example 4

The above procedure is repeated using 112 parts of citraconic anhydride, 150 parts of toluene, 5 parts of Raney nickel, and 90 parts of ammonia at 170° C. with hydrogen under a pressure of 220 atms. There are obtained about 10 parts of methyl pyrrolidine and about 76 parts methyl pyrrolidone; the latter yield is about 75 parts of theoretical.

Example 5

The above procedure is repeated using 98 parts of maleic anhydride, 5 parts of Raney nickel, 150 parts of dioxane, 155 parts of methyl amine and hydrogen at 250 atms. and 270° C. After a reaction period of about ten hours, the mixture is worked up. Approximately 69.5 grams (70% of theoretical) of the desired N-methyl pyrrolidone is obtained.

Thus, as these examples demonstrate, pyrrolidones are obtained directly and in good yield when a maleic anhydride is treated with ammonia or a primary amine and hydrogen in the presence of a hydrogenation catalyst at high temperatures and high pressures. Organic solvents and inert gases may be included.

In this way, maleic anhydride, methyl-maleic anhydride, vinyl-maleic anhydride, hexyl-maleic anhydride, diisobutenyl-maleic anhydride, cyclohexyl maleic anhydride, cyclo-hexenyl maleic anhydride and similar alkyl, alkenyl, cyclo-alkyl, cyclo-alkenyl and aryl maleic anhydrides are converted into the corresponding pyrrolidones. In the process, the unsaturated substituents are converted into saturated groups but, aromatic substituents appear unchanged in the pyrrolidones. Cyclic ethers such as dioxane or tetrahydrofuran, or cycloaliphatic hydrocarbons such as cyclohexane, or benzene hydrocarbons such as toluene, xylene or ethyl benzene, may be used as solvents.

In place of ammonia, a primary amine may be employed. By this means a variety of N-substituted pyrrolidones can readily be obtained. The amine may be alkyl, aryl, or heterocyclic and may contain about one to twenty carbon atoms.

The temperature may be 150° to 350° C., preferably from 220° to 270° C., and the pressure 100 to 300, preferably 150 to 250 atmospheres. The hydrogenation catalysts may be nickel and/or cobalt, Raney nickel, Raney cobalt, palladium and/or platinum. The catalysts may be supported on fuller's earth, "kieselguhr," pumice powder, or charcoal, and they may include activators such as chromium or molybdenum. About one to ten percent of catalyst based on the weight of the anhydride to be converted may be used.

Pyrrolidones may be separated from the reaction mixture by filtration to separate the catalyst, and by distillation to separate any solvent present. They may be obtained in desired purity by fractional distillation.

In view of the foregoing disclosures, variations and modifications thereof will be apparent to one skilled in the art, and it is intended to include within the invention all such variations and modifications except as do not come within the scope of the appended claims.

What is claimed is:

1. A method of preparing an alpha-pyrrolidone which comprises catalytically reacting the corresponding maleic anhydride with hydrogen and a member of the group consisting of ammonia and primary amines in the presence of a hydrogenation catalyst under elevated temperatures in the range of 150 to 350° C. and pressure in the range of 100 to 300 atms., and recovering the desired pyrrolidone.

2. The method of claim 1 wherein maleic anhydride is converted to alpha-pyrrolidone.

3. The method of claim 1 wherein citraconic anhydride is converted to methyl pyrrolidone.

References Cited in the file of this patent
UNITED STATES PATENTS 2,187,745    Lazier _____ Jan. 23, 1940
2,801,249    Miller _____ July 30, 1957